United States Patent [19]

Thrasher, Jr. et al.

[11] Patent Number: 4,885,948
[45] Date of Patent: Dec. 12, 1989

[54] STABILIZED MOTOR DRIVEN ACTUATOR

[75] Inventors: Robert P. Thrasher, Jr.; Gerald R. Stinson, both of Columbus, Mich.

[73] Assignee: United Technologies Electro Systems, Inc., Columbus, Miss.

[21] Appl. No.: 217,252

[22] Filed: Jul. 11, 1988

[51] Int. Cl.<sup>4</sup> ............................................. F16C 33/22
[52] U.S. Cl. ...................... 74/89.14; 74/425; 310/83; 384/295
[58] Field of Search ...................... 74/7 D, 425, 89.14; 384/295; 310/83

[56] References Cited

U.S. PATENT DOCUMENTS

| 2,639,394 | 5/1953 | Douglas | 310/83 |
| 3,455,174 | 7/1969 | Pickles | 74/89.14 |
| 4,652,781 | 3/1987 | Andrei-Alexandru et al. | 310/83 |
| 4,699,017 | 10/1987 | Piriou | 74/425 |

FOREIGN PATENT DOCUMENTS 2627645  2/1977  Fed. Rep. of Germany ........ 74/425

Primary Examiner—Leslie A. Braun
Assistant Examiner—Scott Anchell

[57] ABSTRACT

An electric motor actuator (10) has an armature shaft (18) with a damper (28) comprising a collar (30) fit tightly into a housing (14) and slid over the shaft (18). The damper (28) has a plurality of spring-like fingers (32) protruding from the collar (30) supporting tghe shaft (18) intermediate to its journaled extreme ends (24, 26) by exerting sufficient force to damp vibrations caused by rotation of the shaft and counter-act the tendency of the shaft to move radially. The damper (28) is formed of a resilient, self-lubricating material impervious to grease, so as to isolate electrical motor parts from greased gears driven by the armature shaft.

7 Claims, 1 Drawing Sheet

STABILIZED MOTOR DRIVEN ACTUATOR

DESCRIPTION

1. Technical Field

This invention relates to vibration stabilization of a motor armature shaft.

2. Background Art

Electric motors may be used to drive gears to achieve actuation, or mechanical displacement, as in automotive window lift mechanisms and various seat actuators. In any application it is necessary that the gears be driven reliably and with minimal vibration and noise. In situations where a rotating motor armature is connected to a shaft, the armature shaft may be journaled at its extreme ends leaving the middle section of the shaft unsupported. The forces resulting in shaft rotation may cause the armature shaft to move radially in a vibrating manner, thereby generating objectionable audible noise. Undesirable radial movement also negatively affects the manner in which the shaft meshes with gears being driven.

Particularly, in an application where a motor armature shaft with a worm is used to drive a worm gear, the armature shaft journaled at its extreme ends is unsupported in the middle and will move radially in a vibrating manner as the armature is rotated. The radial movement, resulting in audible vibration, also tends to exacerbate separating forces between the worm gear and the worm, allowing the worm to slip teeth in the worm gear.

Several U.S. Patents, particularly U.S. Pat. No. 4,742,726 (Adam et al.) disclose similar electric motor actuators. These patents generally refer simply to bearings intermediate to the armature shaft supporting the shaft, which is journaled at its extreme ends. However, the problems with electric motor actuators described above are not so easily solved, especially when economic considerations make it desirable to manufacture the motors via an automated process whereby a unitary motor armature and shaft assembly may be machine fitted into and attached to a gear assembly housing. Motor armature shafts, to be manufactured at minimum expense, are likely to be produced from a uniform diameter blank or straight shaft which is rolled to embed a worm. The rolling process results in a projected helical rib formation, the worm, which is of a greater diameter than the remainder of the uniform diameter straight shaft.

The unsupported middle of an armature shaft with a roller worm can not simply be journaled by a bushing or bearing because the diameter of the shaft at the worm is greater than the shaft diameter in the middle. Any bushing or bearing would have to be large enough for the worm to fit through easily during assembly and would therefore be ineffective in journaling the middle of the armature shaft as it would not contact the lesser diameter of the middle of the armature shaft. The same problem may obtain with radially-toothed gears, splined shafts, etc. which are of greater diameter than the original shaft.

DISCLOSURE OF INVENTION

Objects of the invention include, damping of vibration of a rotating armature shaft and consequently reducing noise and the tendency of a drive means on the shaft to move away or separate from the teeth of a gear being driven thereby, when operating under loaded conditions.

According to the invention, the addition of an armature shaft damper, which the drive means fits through but which also comes into contact with the lesser diameter portion of the armature shaft, substantially limits the radial movement of the armature shaft when placed in an intermediate position relative to the armature shaft's journaled extreme ends.

In further accord with the invention, an armature shaft damper embodied as a collar with protruding fingers fitting about the armature shaft, limiting radial movement and applying sufficient force to the armature shaft, stabilizes and damps vibration of the rotating shaft, thereby reducing noise and the possibility of gear slippage.

A feature of the invention, depending on the manner of implementing the armature shaft damper, is that it may serve to reduce flow of gear lubricant from a gear housing assembly into an attached motor housing assembly.

These and other objects, features and advantages of the present invention will become more apparent in light of the following detailed description of an illustrative embodiment thereof, as illustrated in the accompanying drawings.

BEST MODE FOR CARRYING OUT THE INVENTION

Figures 1, 2:
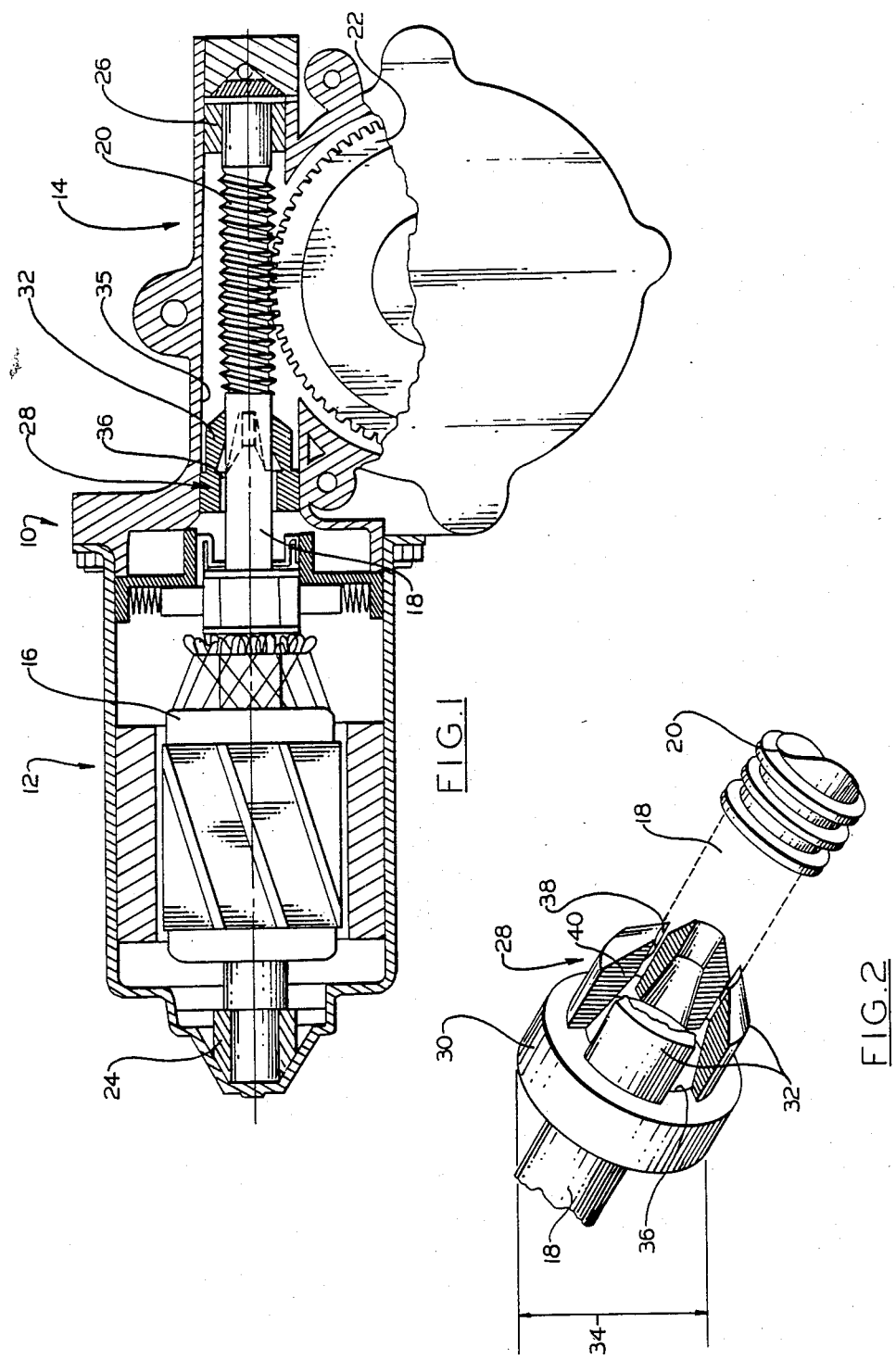
FIG. 1 is a partially sectioned, partial side elevation view of a motor housing assembly having an armature shaft with worm attached to a gear housing assembly incorporating the present invention.
FIG. 2 is a perspective view of an illustrative embodiment of an armature shaft damper according to the present invention.

Referring now to FIG. 1, an actuator 10 comprises a motor housing 12 connected to a gear housing 14. The motor housing 12 encloses a unitary armature shaft assembly including a shaft 18 upon which an armature assembly 16 is fixed prior to installation into the motor housing 12. The armature shaft 18 incorporates a drive means such as a worm 20 which meshes with a worm gear 22 in the gear housing 14, which may typically contain grease. The armature shaft 18 is journaled at its opposite ends: in the motor housing 12 at a motor bearing 24, and in the gear housing 14 at an armature shaft bearing 26.

Referring now to FIGS. 1 and 2, a shaft support means, according to the invention, comprises an armature shaft damper 28 formed as an annular collar 30 with a plurality of protruding fingers 32 (four are shown in this illustrative embodiment). The damper 28 is formed of a resilient yet substantially rigid material, preferably a nylon 6/6 for its resiliency, temperature tolerance, self lubrication and imperviousness to grease. The damper 28 is located in an intermediate position between the armature 16 and worm 20 and in close proximity to the worm 20 on the armature shaft 18.

The collar 30 has an outer diameter 34 which is greater than the inner diameter 35 of the gear housing 14, such that the damper 28 can be press fit into the gear housing 14 sufficiently tight that the damper will be lodged in place and stay put.

The inner diameter 36 of the collar 30 is large enough so that the damper 28 can slide over the worm 20, which may be formed by rolling and therefore have a diameter greater than that of the armature shaft 18. With the damper 28 press fit into the gear housing 14, the assembly of the gear housing 14, gear 22 and damper 28 can be joined with the pre-assembled motor housing 12 as the armature shaft 18 slides through the damper 28 into the gear housing 14, which is then attachable to the motor housing 12.

As viewed in FIG. 2, the plurality of fingers 32 protruding from the collar 30 of the damper 28 are opposed in pairs. The distance between the inner surface 38 of opposing fingers is slightly less than the diameter of the armature shaft 18. The fingers 32 are of a spring-like nature that allows the armature shaft 18, including worm 20, to be installed into the gear housing 14 through the damper 28. The inner surface 38 of each finger is arcuate, conforming to and resting on the armature shaft 18 when installed. The spring-like fingers 32 exert a resilient, radially inward force on the armature shaft 18 sufficient to reduce vibration but without significantly loading the rotating shaft.

Additionally, each of the damper fingers 32, may have tapered edges 40 which perform a wiping action as the armature shaft rotates. This wiping substantially inhibits grease in the gear housing 14 from migrating into the motor housing 12.

The invention is described as an actuator incorporating a drive shaft with a worm gear formed by rolling. However, this invention may also be suitable in situations where a radially-toothed gear is incorporated on a drive shaft. Any use wherein a driving means slightly larger than the diameter of a shaft may be a suitable use of this invention.

Similarly, while nylon 6/6 is the preferred material for forming a resilient armature shaft damper 28, a number of polymeric materials including strong elastic polyamides and polytetrafluoroethylene may be employed as might several metallic materials or alloys.

Furthermore, the physical structure of a shaft damper 28 suitable for practicing this invention might vary considerably from that herein described. A suitable embodiment may comprise a collar 30 shaped other than circular, in order to fit tightly into a non-circular housing. Fingers, of virtually any quantity, could be formed without tapered edges or such that greater amounts of material resided at the finger ends to accommodate wear.

Finally, in some embodiments the damper 28 could reside in the motor housing or in a unitary housing that performs the function of multiple housings.

Although the invention has been shown and described with respect to an illustrative embodiment thereof, it should be understood by those skilled in the art that the foregoing and various other changes, omissions, and additions in the form and detail thereof may be made therein without departing from the spirit and scope of the invention.

What is claimed is:

1. An actuator comprising:
    a shaft having drive means extending radially outward from the surface of said shaft;
    an electric motor armature disposed on said shaft;
    housing means for journaling each end of said shaft and housing said armature;
    a gear disposed in said housing means for engagement with said drive means; and
    shaft support means disposed about said shaft within one of said housing means between said armature and said drive means;
    characterized by said shaft support means comprising a collar having outer surfaces lodged in said housing means and an inner diameter larger than the outer diameter of said drive means and having a plurality of fingers extending axially from said collar, each of said fingers having a surface for contacting said shaft which is radially inward from said inner diameter of said collar and which exerts a resilient force against said shaft.

2. The actuator of claim 1, wherein said drive means is a worm formed by rolling said shaft.

3. The actuator of claim 1, wherein said fingers are opposed in pairs.

4. The actuator of claim 1, wherein said surface of each of said fingers is arcuate, conforming to said shaft.

5. The actuator of claim 1 wherein said shaft support means is formed of a resilient material with self lubricating properties.

6. The actuator of claim 1 wherein said shaft support means is formed of a resilient material which is impervious to grease.

7. The actuator of claim 1 wherein said shaft support means is formed of nylon 6/6.

* * * * *